(12) United States Patent
Maehiro

(10) Patent No.: US 7,246,155 B2
(45) Date of Patent: Jul. 17, 2007

(54) USER NAME AND PROFILE INFORMATION MANAGEMENT

(75) Inventor: Kazutoyo Maehiro, Tokyo (JP)

(73) Assignee: Kabushiki Kaisha Square Enix, Tokyo (JP)

( * ) Notice: Subject to any disclaimer, the term of this patent is extended or adjusted under 35 U.S.C. 154(b) by 710 days.

(21) Appl. No.: 10/187,371

(22) Filed: Jul. 2, 2002

(65) Prior Publication Data

US 2003/0009549 A1    Jan. 9, 2003

(30) Foreign Application Priority Data

Jul. 9, 2001   (JP) .............................. 2001-207537
Sep. 16, 2001  (JP) .............................. 2001-324216

(51) Int. Cl.
    *G06F 15/16* (2006.01)
(52) U.S. Cl. ...................................... 709/217
(58) Field of Classification Search ................. 709/217
    See application file for complete search history.

(56) References Cited

U.S. PATENT DOCUMENTS

| | | | |
|---|---|---|---|
| 5,964,660 A | 10/1999 | James et al. | |
| 6,009,458 A | 12/1999 | Hawkins et al. | |
| 6,106,395 A | 8/2000 | Begis | |
| 6,205,478 B1 | 3/2001 | Sugano et al. | |
| 6,487,584 B1 | 11/2002 | Bunney | |
| 6,640,304 B2 * | 10/2003 | Ginter et al. ............... | 713/193 |
| 6,692,359 B1 | 2/2004 | Williams et al. | |
| 6,712,704 B2 * | 3/2004 | Eliott ........................... | 463/43 |
| 6,746,332 B1 | 6/2004 | Ing et al. | |
| 6,860,808 B2 * | 3/2005 | Levitan ........................ | 463/16 |
| 2001/0036865 A1 | 11/2001 | Neal, III | |
| 2002/0042293 A1 | 4/2002 | Ubale et al. | |
| 2002/0126846 A1 | 9/2002 | Multerer et al. | |
| 2002/0160837 A1 | 10/2002 | Matsuno et al. | |

FOREIGN PATENT DOCUMENTS

| | | |
|---|---|---|
| EP | 0949787 | 10/1999 |
| EP | 1078667 | 10/1999 |
| JP | 2000-032033 | 1/2000 |
| JP | 2000-066931 | 3/2000 |
| JP | 2000-078182 | 3/2000 |
| JP | 2000-353140 | 12/2000 |
| JP | 2001-014254 | 1/2001 |
| WO | 97/22072 | 6/1997 |

(Continued)

OTHER PUBLICATIONS

English Language Abstract of JP 2000-032033.

(Continued)

*Primary Examiner*—David Y. Eng
(74) *Attorney, Agent, or Firm*—Greenblum & Bernstein, P.L.C.

(57) ABSTRACT

A server properly manages user names which users use in services. Based upon communication with a user terminal, a handle name and a character are selected. The information of the selected character is stored in association with the selected user name. The character profile of the character is stored as information of each associated character. Information relating to the user is also stored, and the information relating to the user is blurred when sent to a user terminal used by another user to maintain privacy.

3 Claims, 15 Drawing Sheets

FOREIGN PATENT DOCUMENTS

WO        01/46824        6/2001

OTHER PUBLICATIONS

English Language Abstract of JP 2001-014254.
English Language Abstract of JP 2000-353140.
English Language Abstract of JP 2000-066931.
The Lost Vikings Game documentation 1996-2000.
Tokoton Asoberu Network RPG, Hello! PC, Japan, Soft Bank Kabushiki Kaisha, vol. 6, 6th Issue, p. 6th Issue, p. 171, Apr. 8, 1999, together with an English language translation of the same.
Thalshara, Ultima Online: Renaissance, Jun. 8, 2000.
Sweeny, Tim. "Unreal Networking Architecture", Jul. 21, 1999.
Texen, Gustav. Guilds: Communities in Ultima Online, Feb. 2002.
Simpson, Zachary Booth. The In-game Economics of Ultima Online. Apr. 7, 1999.
Ultima Online Renaissance, game manual, released Apr. 30, 2002.
"Ultima Online Renaissance Edition", Dengeki PlayStation, Japan, Media Works, Inc., Feb. 23, 2001, vol. 7, No. 6, pp. 172-173.
Atsushi Okamura, "Full-Scale Network RPG Age Beginning from UltimaOnline", Oh! PC, Japan, Sofbank Corporation, Jan. 15, 1998, vol. 16, No. 15, pp. 193-20.

* cited by examiner

FIG.13

| HANDLE UPDATING CODE | USER ID | HANDLE ID | UPDATING INFORMATION (FOR EXAMPLE, AGE BLURRING ON) |

USER NAME AND PROFILE INFORMATION MANAGEMENT

CROSS REFERENCE TO RELATED APPLICATION

The present disclosure relates to subject matter contained in Japanese Patent Application No. 2001-207537, filed on Jul. 9, 2001, and Japanese Patent Application No. 2001-324216, filed on Sep. 16, 2001, the disclosures of which are expressly incorporated herein by reference in their entireties.

BACKGROUND OF THE INVENTION

1. Field of the Invention

This invention relates to servers, information processing methods and recording medium.

2. Description of the Related Art

When video game machines are equipped with Internet access functions, users thereof can enjoy various services through servers of an ASP (Application Service Provider). Exemplary new services include on-line delivery of software games and online network multiplayer games. To enjoy such services, users, generally, carry out user registration to providers in advance. Based upon information registered by the user registration, the providers manage the attribute information of users and fees associated with each service.

The user registration is carried out by registering a password and user names that correspond with attributes such as an address, name and telephone number of the user. Therefore, there is no need for the user name to be the same as the name of the user. For example, in online multiplayer game services provided by providers, a user can join in the games with his/her own user name which is set at discretion, while corresponding the user name with a character appearing in the game. When various types of games are provided by providers, users may wish to join in the games with different user names which are changed with respect to each title of the games or to join in the games with the same user name representing multiple characters.

Furthermore, in a chat, during message transmission and during games, it may occur that the user's profile information (such as age, sex, occupation and address) is sent to other users, while users may not desire their profile information to be provided to other users in detail.

SUMMARY OF THE INVENTION

The present invention was made in view of these problems and it aims to properly manage user names to be used in services. Also, the invention aims to properly provide user information to other users.

To accomplish such aims, a server according to a first embodiment of the invention is connected to a group of user terminals through a network and manages character information of users in each service provided to the users. The server includes a user name receiving system that receives, from the user terminals, a registration of user names to be used by the user, and a transmitter that transmits the received user names to the user terminals. A user name selection receiving system may be provided for receiving, from a user terminal, a selection of a desired user name among the user names to be used by the user in a predetermined service. Furthermore, a storage is provided for storing in a memory the received user name and character information to be used in the service in a linked manner.

According to a second embodiment of the invention, a server is provided, which is connected to user terminals through a network. The server includes a memory table for storing information relating to a user who uses the user terminal. The server further includes a converting system that blurs the information relating to the user stored in the memory table. A transmitter may be provided for transmitting the blurred information to at least one user terminal that is used by another user.

According to a third embodiment of the invention, there is provided a method for processing information in a server, connected to user terminals through a network and manages character information of users in each service provided to the users. The method includes receiving, from the user terminal, a registration of user names to be used by a user, and transmitting the received user names to a user terminal. The method further includes receiving, from the user terminal, a selection of a desired user name, from among the user names, to be used by the user in a predetermined service. The method further includes storing in a memory the received user name and the character information to be used in the service in a linked manner.

According to a fourth embodiment of the invention, there is provided a method for processing information in a server, connected to user terminals through a network. The server includes a memory table for storing information relating to the user who uses the user terminal. The method includes blurring the information relating to the user stored in the memory table, and transmitting the blurred information to at least one user terminal, which is used by another user.

According to a fifth embodiment of the invention, there is provided a recording medium on which is recorded a program for causing a computer to execute processing for managing character information of a group of users in each service provided to the users. The computer is connected to user terminals via a network. The program causes the computer to receive a registration of user names to be used by the users from the user terminal and to transmit the received user names to the user terminal. The program further causes the computer to receive a selection of a desired user name, from among the user names, to be used by the user in a predetermined service from the user terminal. The program further causes the computer to store in a memory the received user name and character information to be used in the service in a linked manner.

According to a six embodiment of the invention, there is provided a recording medium on which is recorded a program for causing a computer, connected to user terminals via a network, to manage information relating to users. The program causes the computer to blur the information relating to the user, and to transmit the blurred information to at least one user terminal, which is used by another users.

BRIEF DESCRIPTION OF THE DRAWINGS

FIG. 13 shows an example of a packet including updating information to be sent according to an embodiment of the invention;

DESCRIPTION OF THE PREFERRED EMBODIMENTS

An embodiment of the present invention will now be described with reference to the drawings.

Figure 1:
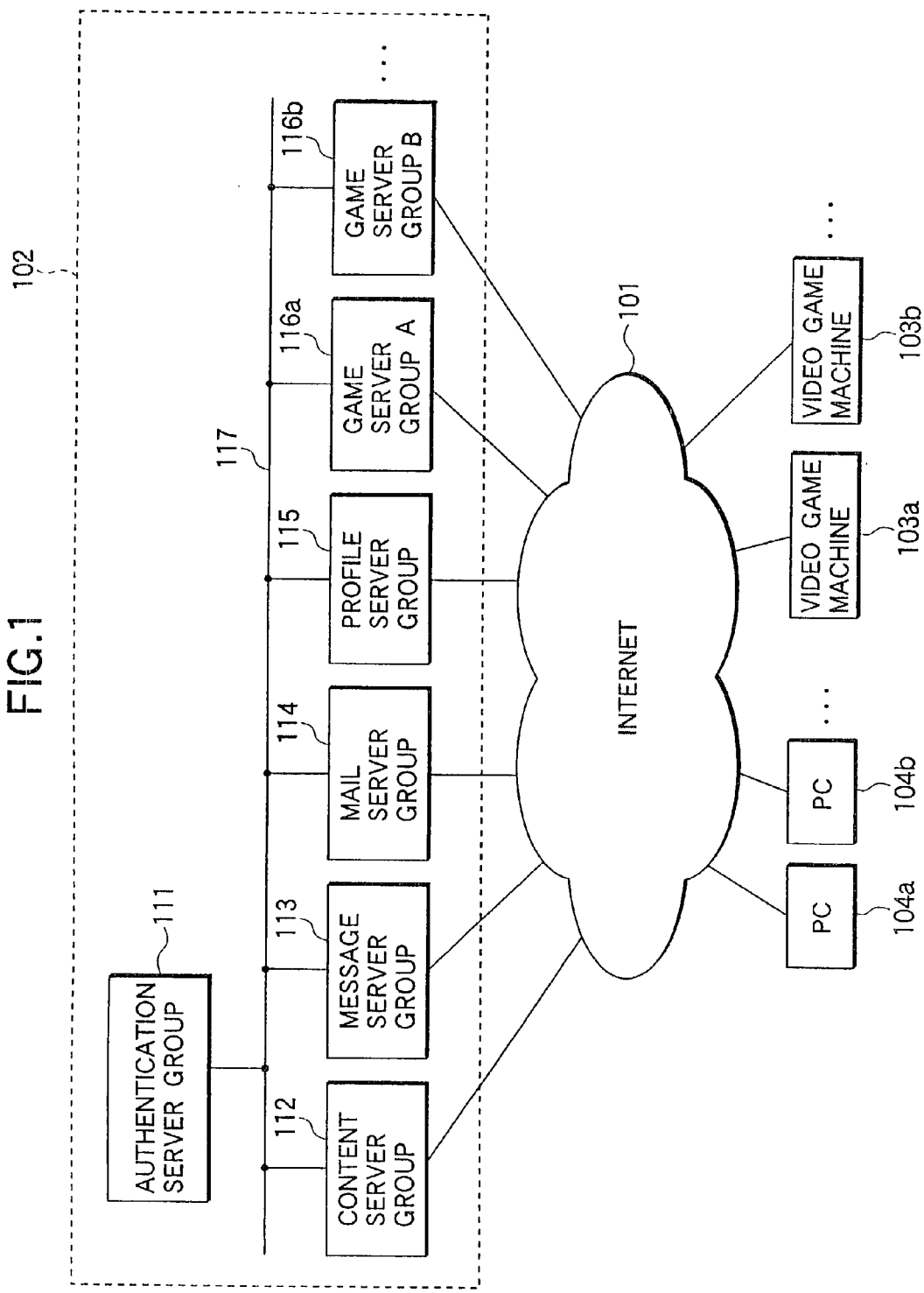
FIG. 1 shows an example of an overall system according to an embodiment of the invention.

FIG. 1 shows an example of a total system in the embodiment. Connected to an Internet 101 are an ASP server group 102, video game machines 103a, 103b and multipurpose computers 104a, 104b serving as clients.

The ASP server group 102 includes multiple groups of servers. An authentication server group 111 may be provided for carrying out account management for user authentication. Also, a content server group 112 may be provided for viewing services of content, such as sounds and motion pictures. The ASP server group further includes a message server group 113, which provides an environment for chatting and messaging, and a profile server group 115, which manages user profiles. Furthermore, game server groups 116a, 116b provide an environment for games. Each server group is connected with each other via a LAN 117.

Such a structure enable users to access the authentication server group 111 in the ASP server group 102 through the Internet 101 from the video game machines 103a, 103b or the multipurpose computers 104a, 104b to obtain authentication. The ASP server groups 102 send a menu screen to the users who have obtained the authentication. When the user selects a service displayed on the menu screen, the video game machines 103a, 103b or the multipurpose computers 104a, 104b connect to the group of servers corresponding to the selected service so that users can enjoy the service.

Figure 2:
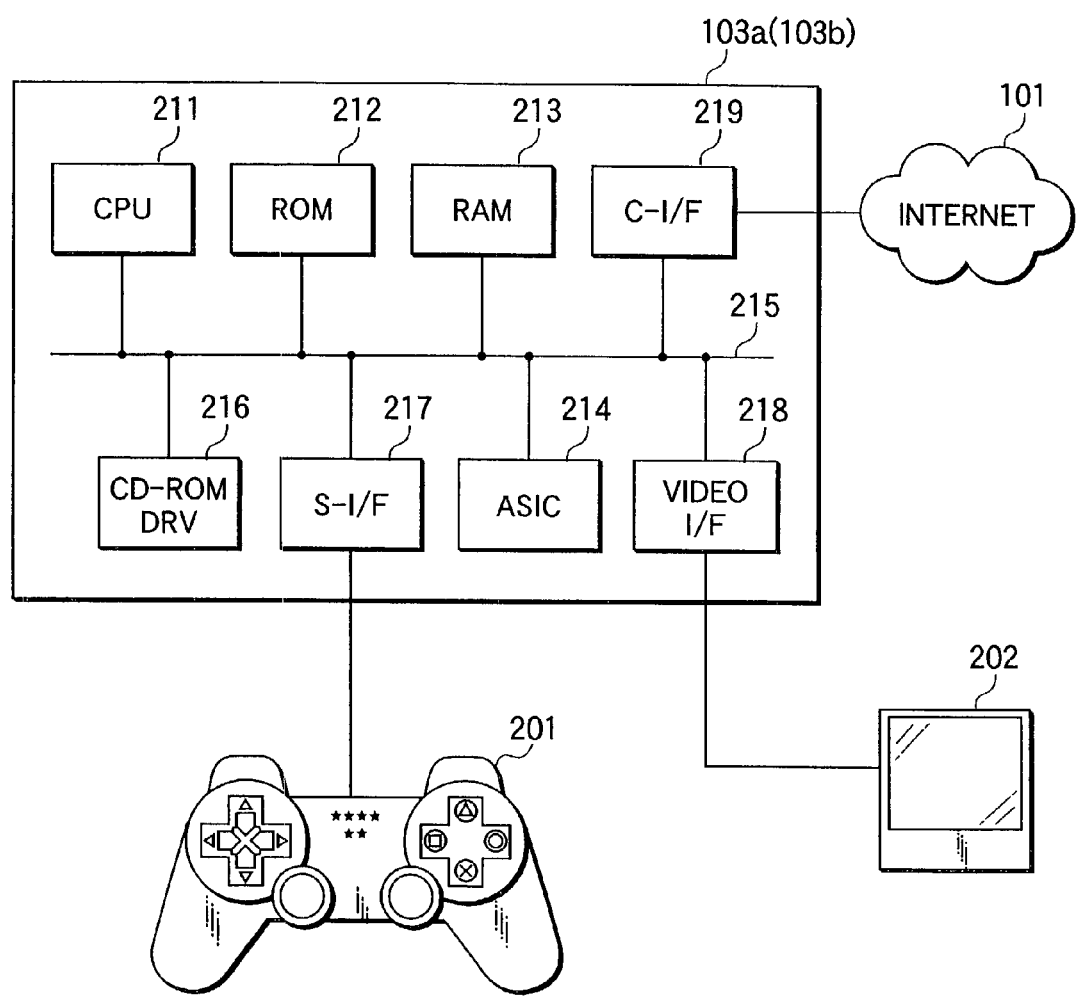
FIG. 2 is a block diagram showing an example of a video game machine according to an embodiment of the invention.

FIG. 2 is a block diagram showing an example of the video game machine. Each of the video game machines 103a, 103b is incorporated with a CPU 211 that controls the overall system, and a ROM 212 that stores a basic program such as a BIOS. The video game machines 103a, 103b also include a RAM 213 that stores a game program and a program for carrying out processing, according to the invention, and is also used as a temporary storing area. An application specified integrated circuit (ASIC) 214 may be provided for carrying out image processing. The components are connected with each other via a bus 215.

Furthermore, a CD-ROM drive 216 may be provided for reading in a program from a CD-ROM which stores game programs or programs for carrying out processing according to the invention. The video machines 103a and 103b further include a serial interface 217 which is connected to a game controller 201, a video interface 218 which is connected to a television monitor 202 and a communication interface 219 for connecting to the Internet 101. The components are also connected to the bus 215. Incidentally, other than CD-ROMs, various other optical discs, magnetic discs and magnetic tapes are considered as a recording medium on which the programs are recorded.

Figure 3:
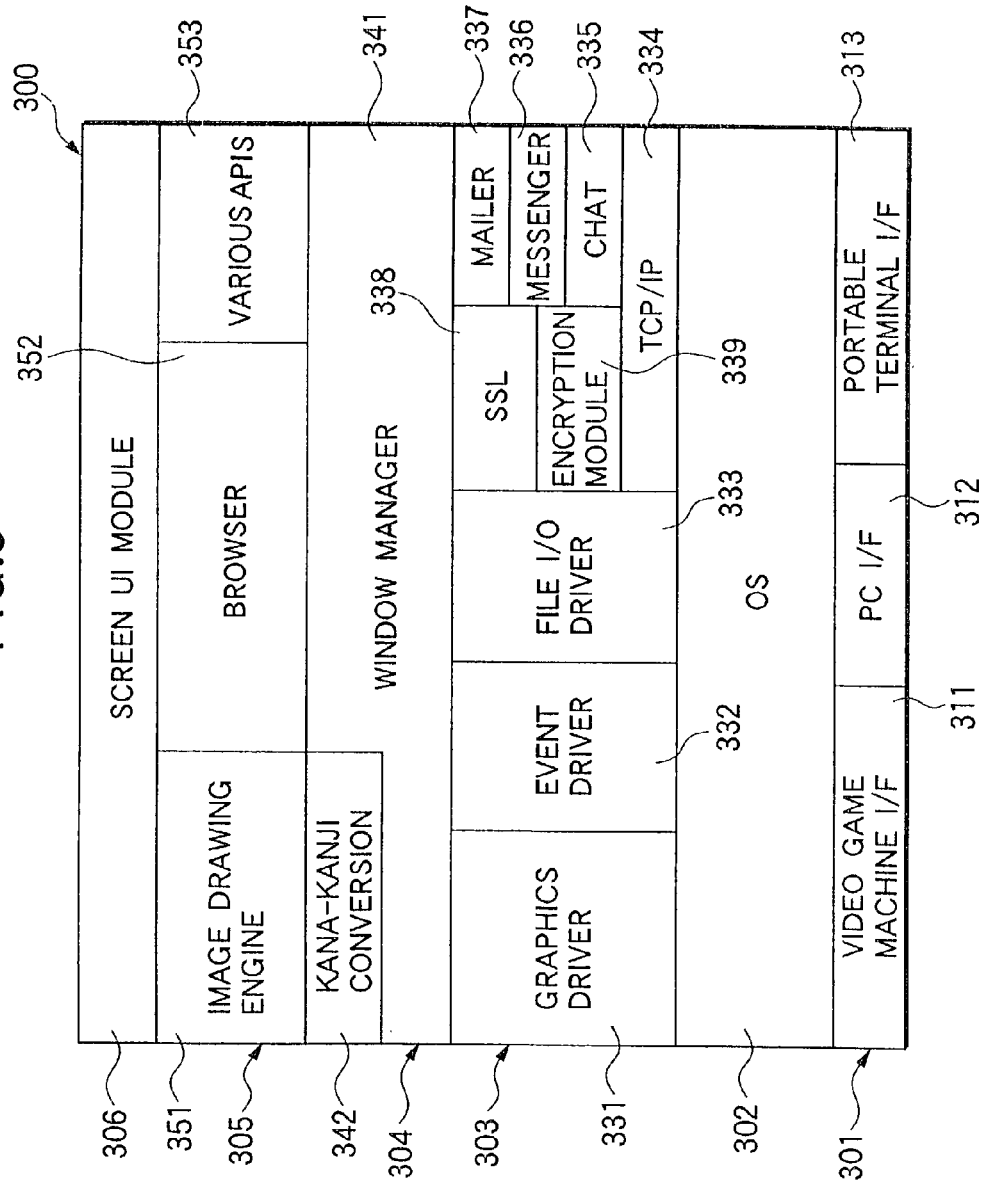
FIG. 3 shows an example of a software module according to an embodiment of the invention.

FIG. 3 shows an example of a software module, according to an embodiment. For example, in the video game machines 103a, 103b, the CPU 211 reads out a software module 300 through the CD-ROM drive 216 from the CD-ROM. Then, the module is stored in the RAM 213. Six layers from a first layer 301 to a sixth layer 306 make up the software module 300.

The first layer 301 is a physical interface and includes a video game machine IF 311, a multipurpose computer IF 312 or a portable terminal IF 313, depending on the hardware with which the software module 300 is equipped. The second layer 302 is an operating system.

A third layer 303 is constructed by various drivers, communications protocols, etc. The drivers includes a graphics driver 331 for carrying out lettering, line-drawing, marking out, scrolling, font setting, etc., an event driver 332 for obtaining events from a keypad, a keyboard, a mouse, etc., and a file I/O driver 333 for controlling a file medium.

The communications protocol can include a TCP/IP 334 which forms an Internet layer protocol and a transport layer protocol, a chatting protocol 335 serving as a application layer protocol, a messaging protocol 336 and a mailer protocol 337. Incidentally, other protocols can be used as the communications protocol. For example, UDP can be used as the transport layer protocol. Also, a SSL(Secure Socket Layer) 338 may be provided for assuring security for TCP/IP communication. Furthermore, the communications protocol includes an encryption module 339 serving as cryptograph intercommunicated between client servers by use of SSL algorithms.

A fourth layer 304 is constructed by a window manager 341 for starting various modules, managing memory sources, etc., and a Kana-Kanji conversion system 342 serving as FEP(Frond End Processor), which system outputs Kanji (Chinese character) candidates in response to Hiragana (Japanese cursive syllabary) inputs.

A fifth layer 305 includes an image drawing engine 351. The image drawing engine 351 draws an image made by PNG (Portable Network Graphics), GIF (Graphics Interchange Format), JPEG (Joint Photographic Experts Group), MPEG (Moving Picture Experts Group), Java (Trademark) Script, etc. The fifth layer 305 also includes web page browsing software 352 for analyzing a page description language such as HTML (Hyper Text Markup Language) and displaying a screen in accordance with tag instructions. Various types of APIs (Application Programming Interfaces) 353 may be provided as interfaces for communicating with each group of servers.

A sixth layer 306 is a screen user interface (UI) module and serves as a user interface module for setting a display showing various screen and dialogs.

An message exchange using the messenger protocol 336 will now be explained. This message exchange is carried out by a messenger. The messenger is an application software having simplified electronic mailer function by which users registered in the authentication server group 111 communicate with one another through the messenger server group 113. It is different from electronic mail in that messages are exchanged when the video game machines 103*a*, 103*b* or the multipurpose computers 104*a*, 104*b* of transmission side and receiving side users are connected to the server group 102.

Figure 4:
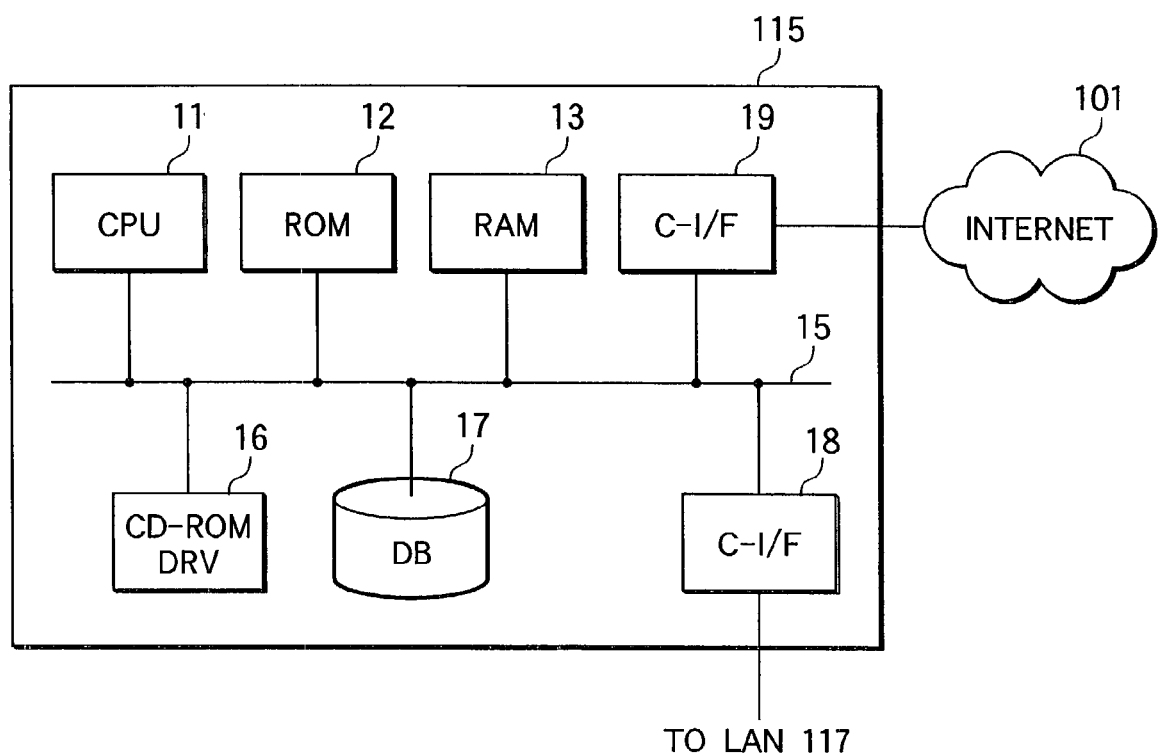
FIG. 4 is a block diagram showing an example of the profile server group according to an embodiment of the invention.

FIG. 4 is a block diagram showing an example of the profile server group, according to an embodiment. In the profile server group 115, the CPU 11 for controlling the overall system, the ROM 12 and the RAM 13, which stores programs for carrying out processing according to the invention and is used as a temporary memory area, are connected by the bus 15.

Furthermore, the CD-ROM drive 16 which reads in a program for carrying out processing according to the invention stored in the CD-ROM, a database 17 for storing information relating to users, the communications interface 18 for connecting to the LAN 117 and the communications interface 19 for connecting to Internet 101 are also connected to the bus 15.

Figure 5:
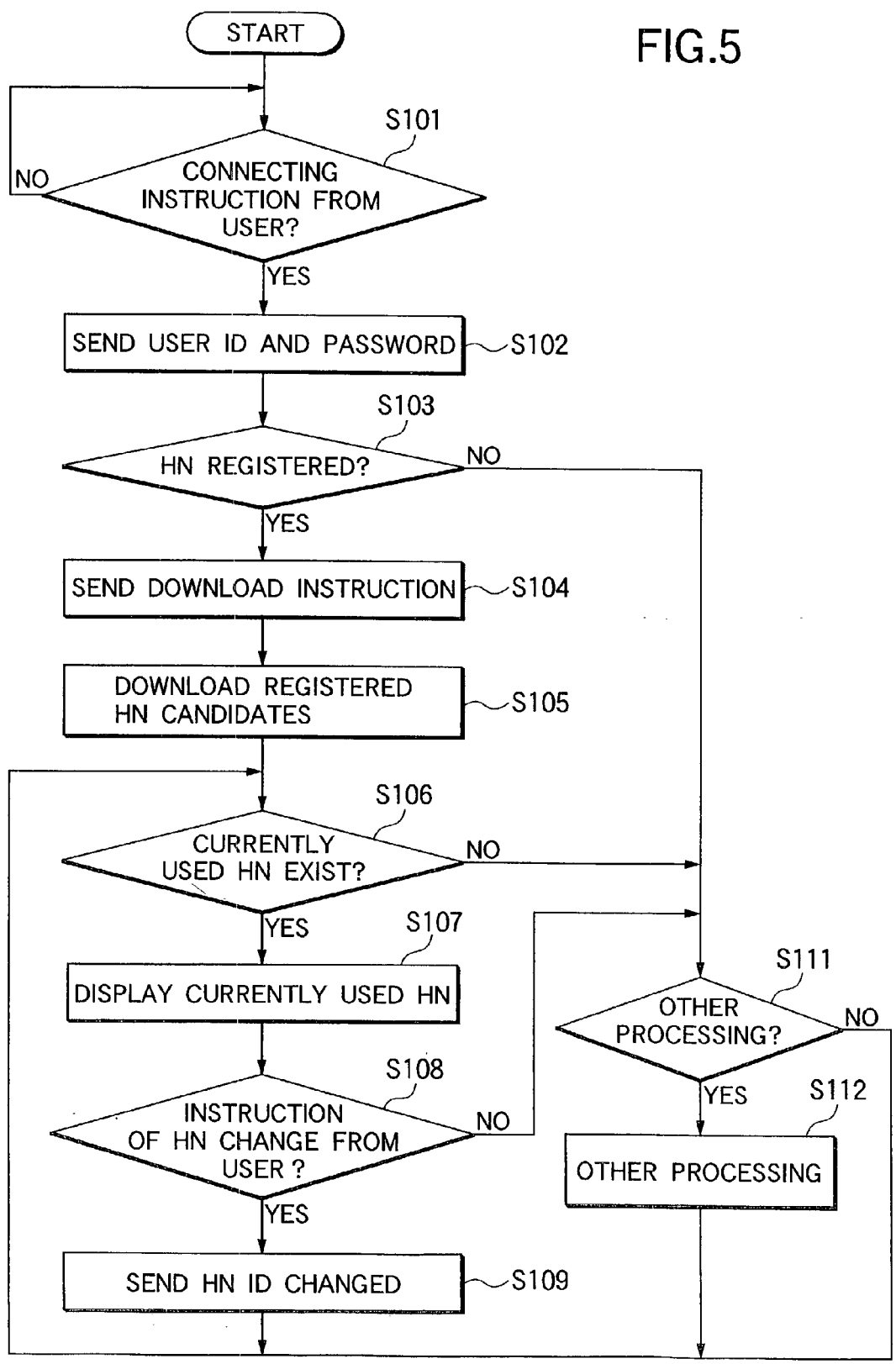
FIG. 5 is a flowchart showing an example in case of log-in according to an embodiment of the invention.

FIG. 5 is a flowchart showing an example of log-in, according to an embodiment. When a user accesses the authentication server group 111 in the server group 102 from the video game machines 103*a*, 103*b* or the multipurpose computers 104*a*, 104*b* (hereinafter referred to as a "TERMINAL") (S101), the user is asked to give a user ID and a password. The TERMINAL sends the user ID and the password, which the user has input, to the authentication server group 111 (S102).

In one embodiment, the user ID and the password are used for carrying out account management for user authentication for the entire ASP server group 102. A user can use multiple user names for identifying the user with regard to each account, which is specified by a user ID and a password when enjoying various services. This user name is referred to as a handle name and registered in the profile server group 115 associating with the user ID.

It is confirmed whether the handle name (HN) has already been registered in the profile server group 115 (S103), and if confirmed, TERMINAL sends an instruction for downloading the registered handle name from the profile server group 115 (S104). The TERMINAL in which the handle name is downloaded from the profile server group 115 (S105) searches to determine whether the handle name is currently being used (S106).

As stated above, multiple handle names can be registered (set) and can be freely used for desired services. The handle name currently used is called as an active handle name and can be appointed arbitrarily by a user from the registered handle names. In the profile server group 115, a handle name used in the most recent log-out is added with a code and registered as the active handle name.

The TERMINAL searches the code and in case the handle name is currently being used, it is displayed as an active handle name on an initial screen, explained later with reference to FIG. 6 (S107). Furthermore, in case that there is an instruction for changing the handle name, received from a user (S108), the ID number of the changed handle name is sent to the group of servers 115 and the changed handle name is displayed (S109). The handle name ID number is an identification number for specifying a handle name and they are related with each other in the profile server group 115. Subsequently, the processing returns to S106.

The TERMINAL determines whether other processing should be carried out in case that the handle name is not registered in the profile server group 115, in case that there is no handle name currently being used, and in case that there is no instruction for changing the handle name (S111) and if necessary, other processing is carried out (S112). The other processing may be normal processing carried out in the user TERMINAL of a user in case that the handle name is not registered in the profile server group 115, such as registration processing to the profile server group 115. Thereafter the processing returns to S106.

Thus, the handle name currently being used is displayed and if there is a change, processing is carried out with the profile server group 115 as needed.

Figure 6:
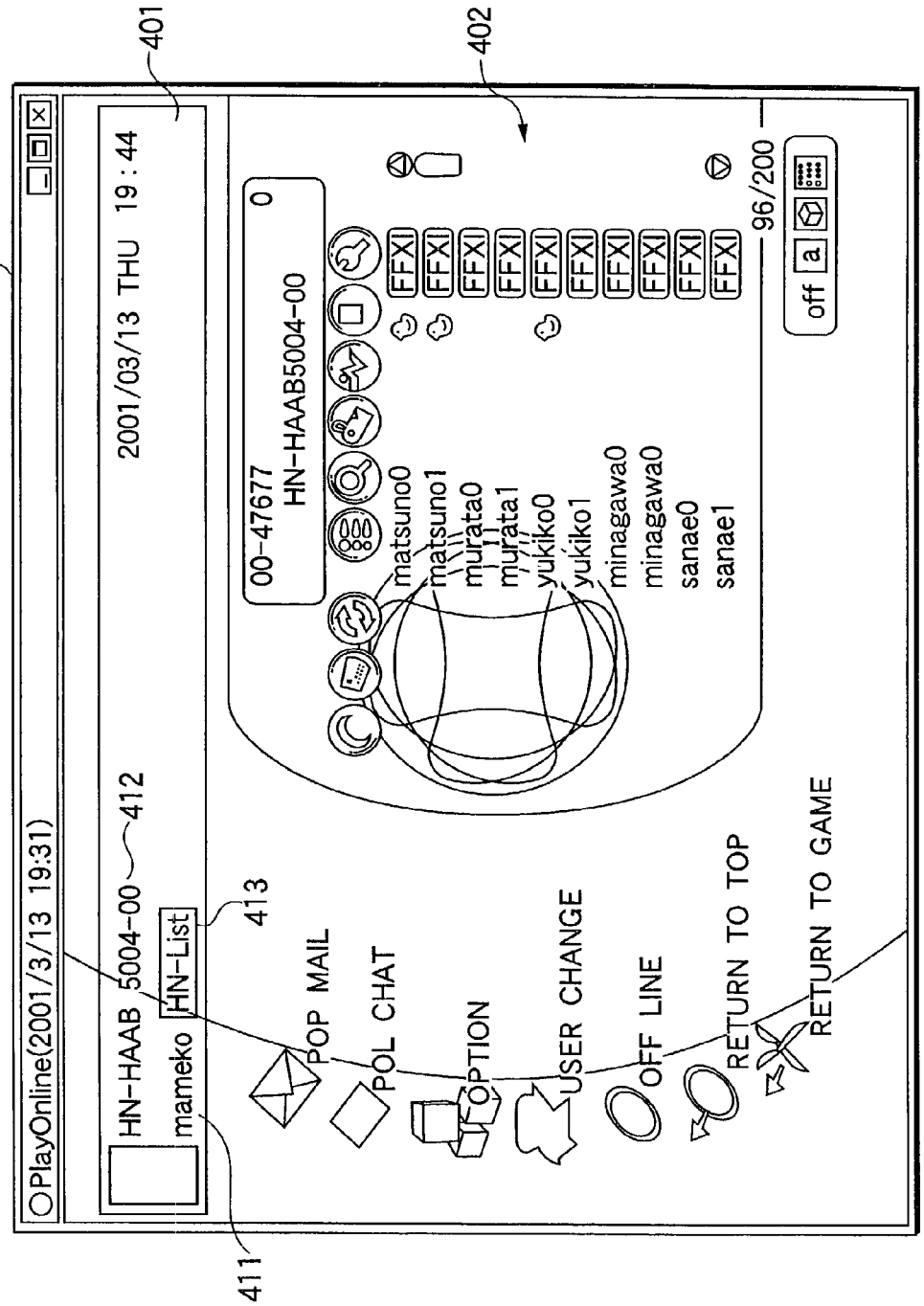
FIG. 6 shows an example of an initial screen according to an embodiment of the invention.

FIG. 6 shows an example of an initial screen, according to an embodiment. The initial screen 400 includes active handle name information 401 and a friend list 402. The active handle name information 401 displays both a handle name currently being used, i.e., an active handle name 411 and its handle name ID number 412. Also, displayed is a handle name list button 413 for displaying a handle name list screen for registration, modification and change of handle names.

Figure 7:
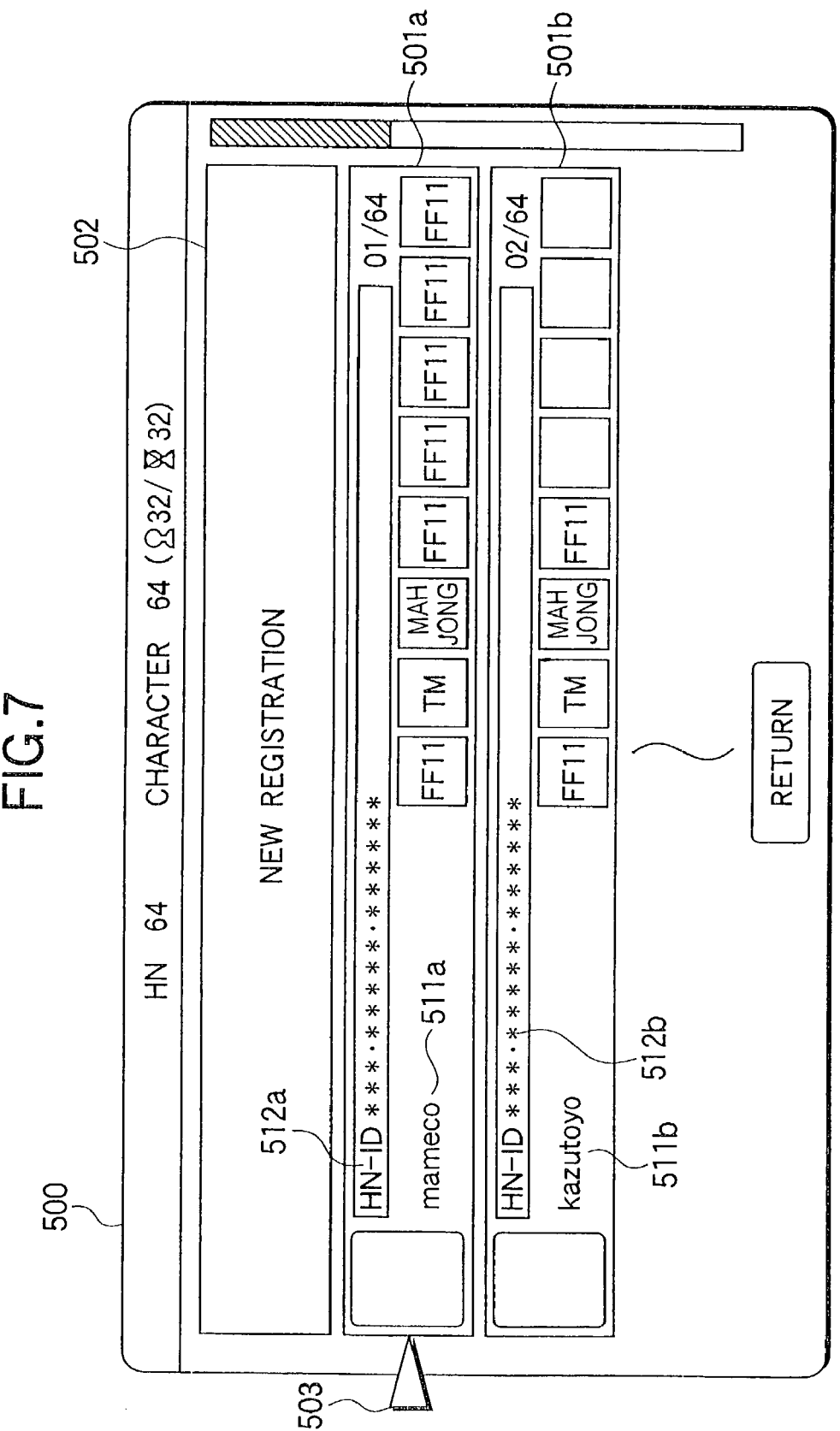
FIG. 7 shows an example of a handle name list screen according to an embodiment of the invention.

FIG. 7 shows an example of the handle name list screen, according to an embodiment. The handle name list screen 500 shows handle name information 501*a*, 501*b* relating to handle names already registered and an input screen 502 for carrying out registration or modification, etc. The handle name information 501*a*, 501*b*, similar to the active handle name information 401, shown in FIG. 6, displays both handle names 511*a*, 511*b* and their handle name ID numbers 512*a*, 512*b*.

The active handle name is pointed to by a cursor 503, and a user can arbitrarily change the active handle name by moving the cursor. In case that there is an instruction for changing the active handle name received from a user, the TERMINAL sends an ID number of the changed handle name to the profile server group 115 and the changed active handle name is displayed in the active handle name information 401.

While a user is enjoying a service such as an electronic mail service and electronic conference service provided by providers, the active handle name may be used as a name of a sender in the TERMINAL so that a message may be sent using the active handle name.

The relation between a handle name and a character will now be explained. In an embodiment, for example, when joining in online multiplayer type games, a user accesses the game server groups 116*a*, 116*b* to join in the game by use of the character which is registered in association with the active handle name. The character is registered in association with a specific game. The character is an object which is operated by a user in a game space, and has data including an icon of a character displayed on a game screen, various game parameters relating to the character and a right to access to the game.

Figure 8:
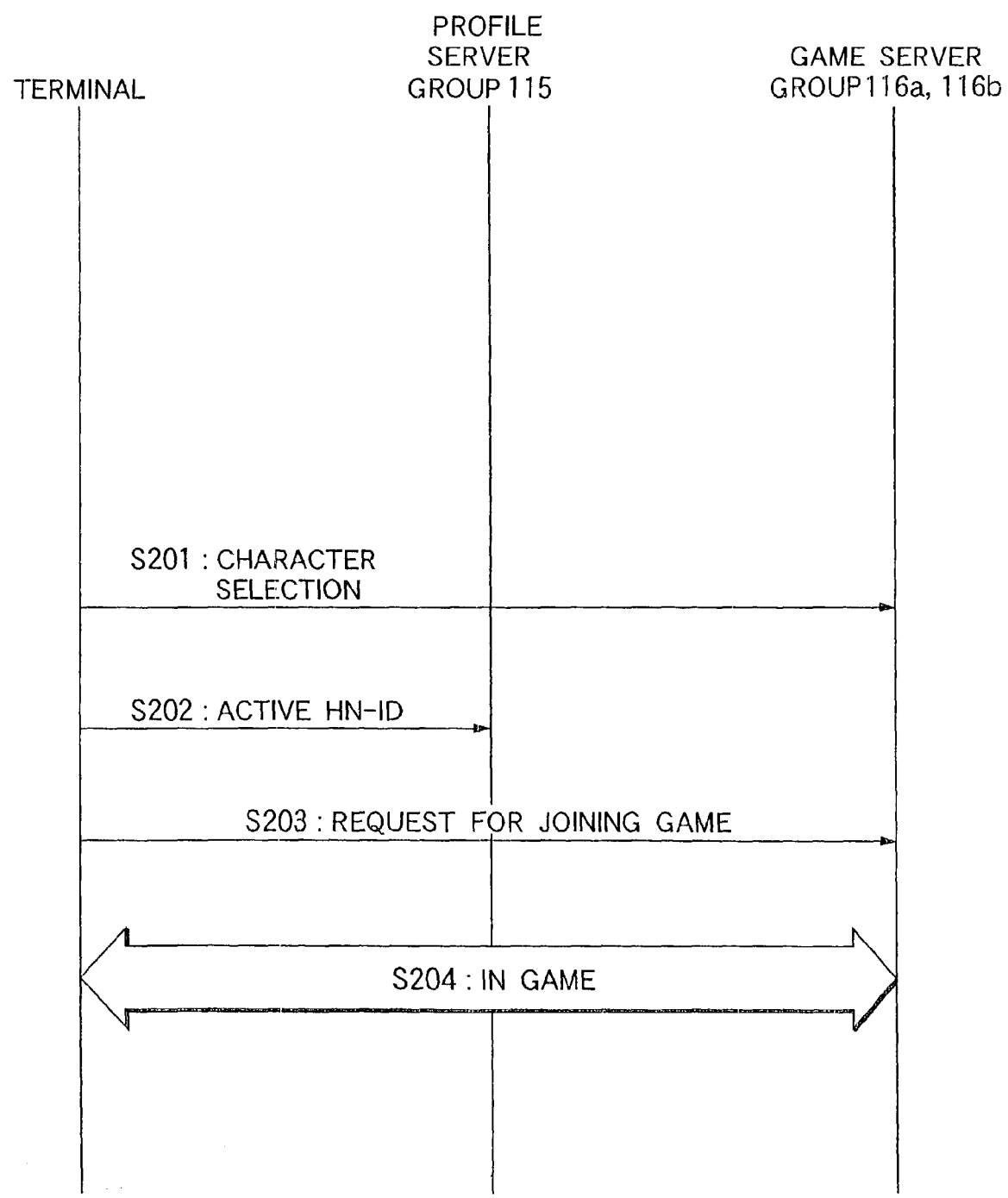
FIG. 8 is a sequence chart showing an example when a game is played according to an embodiment of the invention.

FIG. 8 is a sequence chart showing an example of playing a game, according to an embodiment. A user accesses the groups of servers 116*a*, 116*b* before joining in the game, and can select a character arbitrarily (S201). At this time, in case that the handle name associated with the selected character is different from an active handle name, the TERMINAL treats the handle name associated with the character as the active handle name and sends its handle name ID number to the profile server group 115 (S202). The user requests to join in the game by use of the selected character (S203) and can join the game (S204).

Here, a user can select the handle name associated with the character. That is, the user associates the character to the handle name and cancels any previous association.

Figure 9:
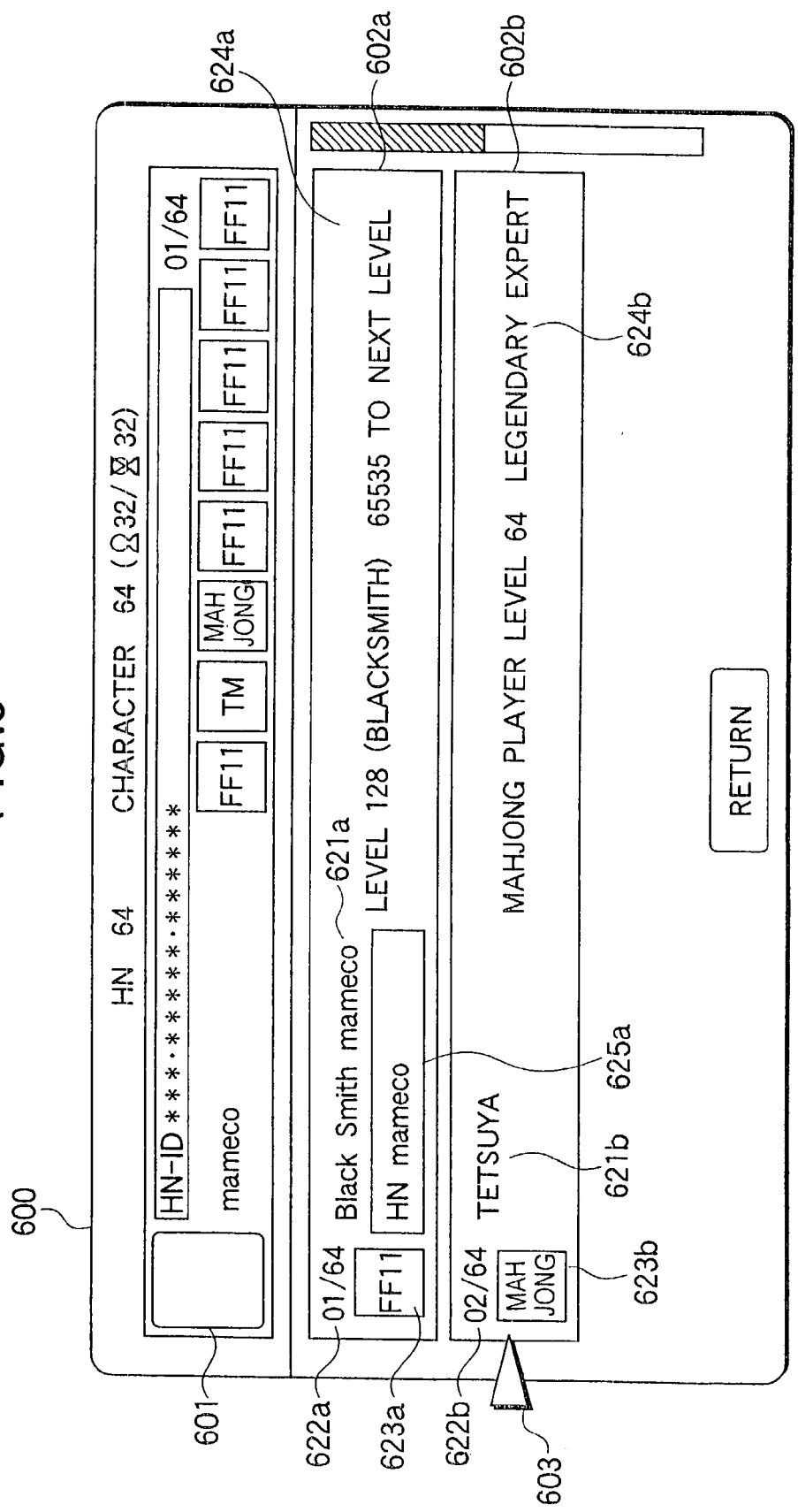
FIG. 9 shows an example of a screen on which character registration (in association with a handle name) is carried out according to an embodiment of the invention.

FIG. 9 is a drawing showing an example of a screen for registering a character (associating to a handle name) according to an embodiment. This screen 600 is a screen which is displayed in response to a user's request from an initial screen or a handle name management screen and a screen for registering the character.

Displayed on the character list screen 600 are active handle name (here "mameco") information 601 and character information (such as 602a, 602b) relating to the character. The character information 602a, 602b includes character names 621a, 621b, character numbers 622a, 622b, content icons (icons of contents (such as a game) in which the character is used) 623a, 623b, comments 624a, 624b relating to the character and a handle name 625a associated therewith. In the example of FIG. 9, the character shown in the character information 602a is registered. That is, it is associated with the handle name (here, "mameco"). On the other hand, a character shown in the character information 602b is not registered, i.e., not associated with the handle name.

Here, when the character not associated with the handle name (for example, the character shown in the character information 602b) is selected by bringing a cursor 603 to the character information 602b, the character becomes associated with the active handle name. Also, when the character associated with a handle name other than the active handle name is selected with the cursor 603, the association is changed so that the selected character becomes associated with the active handle name.

When it is desired to associate a handle name other than the active handle name, the handle name is first appointed as the active handle name and then, a similar operation may be carried out.

Figure 10:
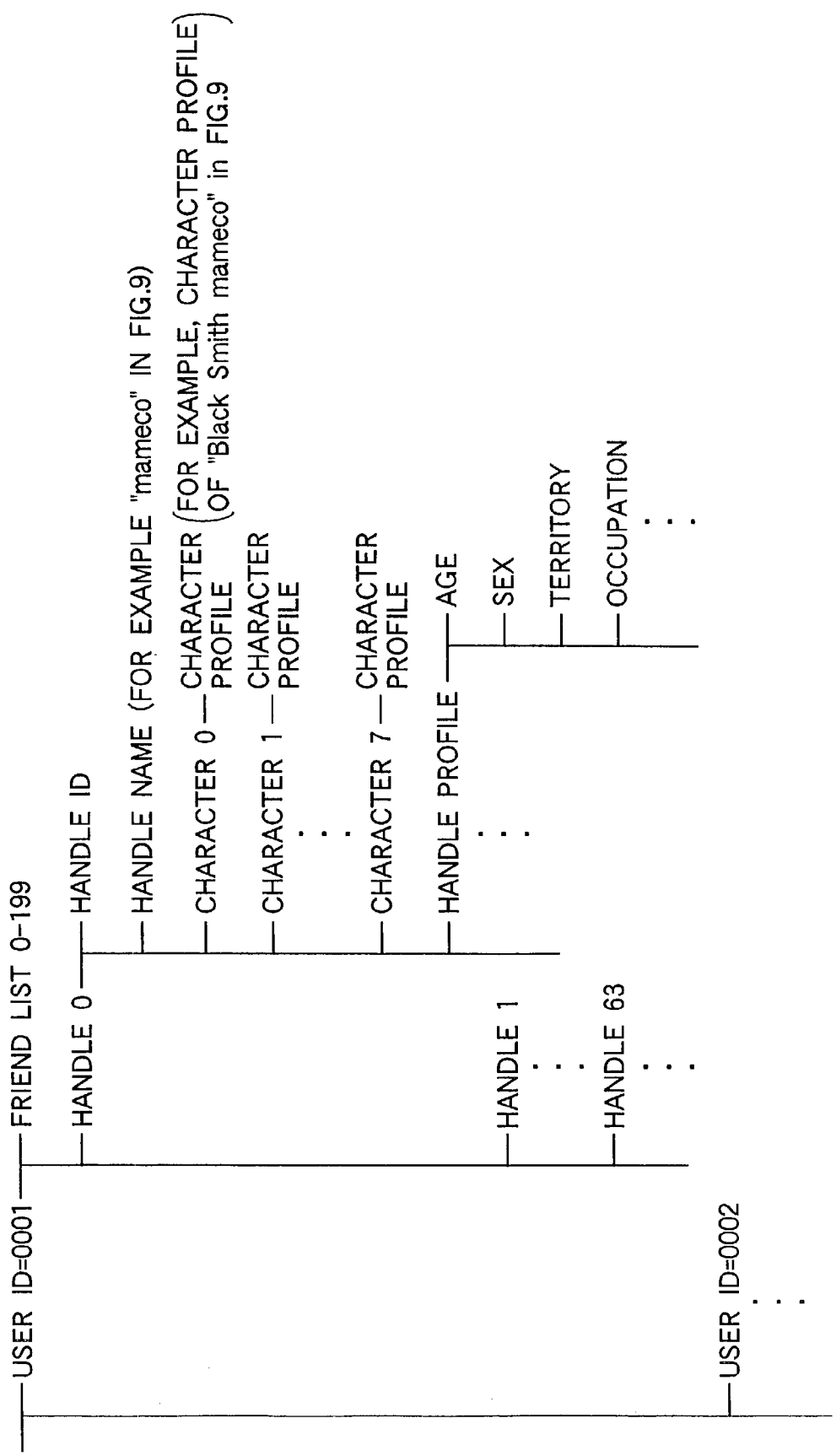
FIG. 10 shows an example of information relating to a user (memory table) which is held (stored) in the profile server group according to an embodiment of the invention.

FIG. 10 is a drawing showing an example of information relating to users (memory table) to be held (stored) in the profile server group 115 according to the embodiment. With regard to each of users (a user having user ID=0001, a user having user ID=0002, . . . ), a friend list and handle name information etc. are held. In the embodiment, a friend list can register and hold two hundred pieces of information at most, and each friend list includes information such as a user ID, a handle ID, and a handle name of the friend (other user). Also, sixty four (64) handles (in one embodiment) can be registered and stored, and each handle holds information such as the ID of the handle, the handle name, the character, and the handle profile. The handle profile information includes information such as age, sex, territory and occupation by way of example. Incidentally, in an embodiment, information on each attribute in the handle profiles indicates whether it should be blurred when disclosed to other users.

In an embodiment, up to eight characters can be associated with one handle name. The associated information of each character includes a stored character profile. That is, character information is linked (with a pointer) to the handle name and stored. For example, the character profile of the character "Black Smith mameco" is linked to the handle name "mameco", shown in FIG. 9, and stored. The content of the character profile is dependent upon a game. As an example of the content, experience points, money in possession, a level and so on are listed. The character profile is character information to be used in services provided to users by the content server group 112. The profile server group 115 obtains the character profile of the character from the content server group 112 when associating a character with a handle name.

Up to eight characters can be associated with one handle name (in one embodiment). When a user associates a new character with the handle name, and the eight characters have already been associated, the user needs to change one of the eight characters.

Blurring of handle profile information will now be explained. It becomes possible for a user not to disclose handle profile information to other users by setting blurring of the handle profile information (for example, age, sex, address, language, occupation, hobby and target). In one embodiment, there are two methods. One is a method for updating the information to broader concept information, which reflects the handle profile information. The other is a method for updating the information to information which does not reflect the handle profile information. As one example of updating to the broader concept information which reflects the handle profile information, the information of "twenty eight years old" is converted to twenties. Also, as a method for updating to the information which does not reflect the handle profile information, for example, "twenty eight years old" is converted to "SECRET". That is, when using a method for converting to "SECRET", any age is uniformly converted to "SECRET", therefore, it does not reflect the original handle profile information.

Figure 11:
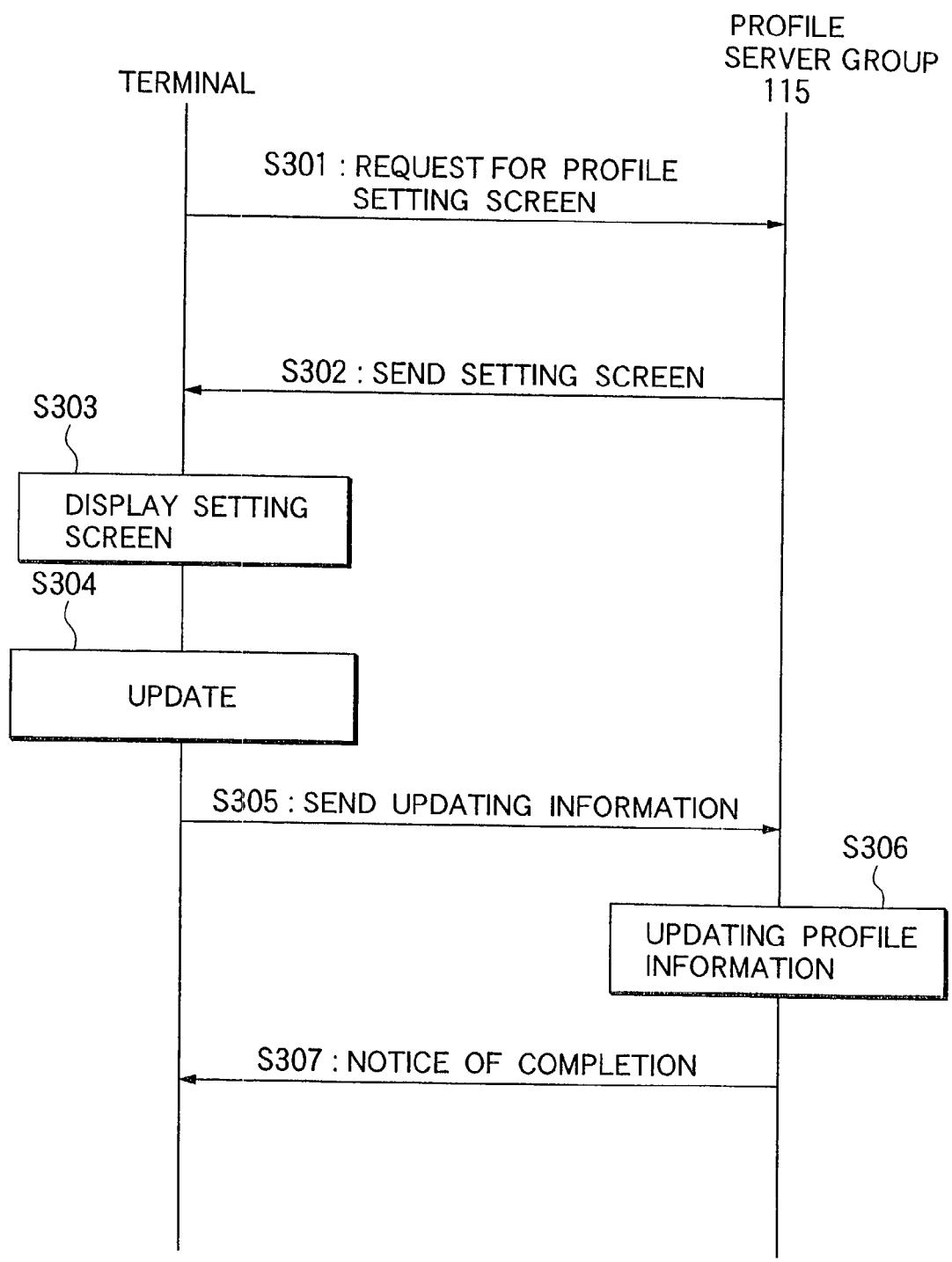
FIG. 11 is a sequence chart showing an example when updating handle profile information according to an embodiment of the invention.

FIG. 11 is a sequence chart showing an example of updating the handle profile information according to the embodiment. When a user requests a profile setting screen at the TERMINAL (S301), the setting screen (information for displaying the screen) is sent from the profile server group 115 (S302). The user can then determine whether the handle profile information should be blurred on the setting screen displayed in the user TERMINAL (S303).

Figure 12:
FIG. 12 shows an example of a profile setting screen according to an embodiment of the invention.

FIG. 12 is a drawing showing an example of the profile setting screen according to the embodiment. In FIG. 12, blurring the age in a handle profile (set to be twenty eight years old) is set. For example, the setting of blurring is updated from OFF to ON (S304), and the updated information is sent to the profile server group 115 (S305).

FIG. 13 is a drawing showing an example of a packet including updating information sent in one embodiment. The packet includes a handle updating code, a user ID and a handle ID in addition to the updating information (for example, information for turning ON the blurring of age).

Figure 14:
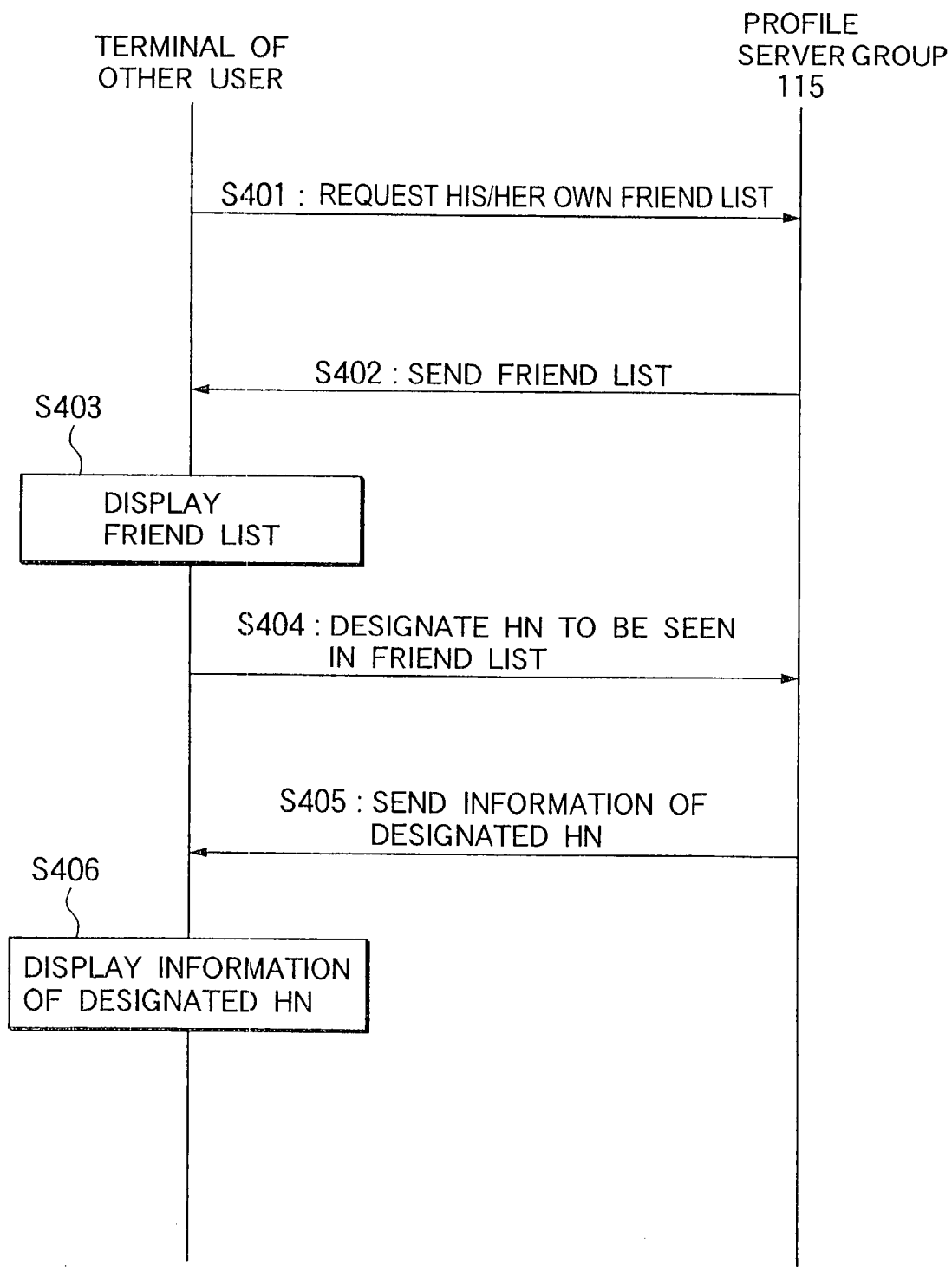
FIG. 14 shows an example when another user inspects handle profile information of a user who sets (turns ON) blurring according to an embodiment of the invention.

FIG. 14 is a sequence chart which shows an example of when handle profile information of a user who sets (turns ON) the blurring is viewed by other users, in an embodiment. For example, when the other user requests his/her own friend list in the TERMINAL (S401), the profile server group 115 sends the friend list (S402). When in the friend list displayed by the other user (S403) a handle name (HN) is designated (S404), the profile server group 115 sends the information of the handle name to the TERMINAL of the other user. In case that blurring is set as to each attribute of the profile information of the handle name, the information of the attribute is sent to TERMINAL of the other user after the information of the attribute is converted to blurred information (S405). When the information sent is displayed in the TERMINAL of the other user (S406), it is found that the information was blurred (FIG. 15).

Figure 15:
FIG. 15 shows an example of a display screen in the case when the other user inspects handle profile information of a user who sets (turns ON) blurring according to an embodiment of the invention.

FIG. 15 shows an example of a display screen in the case when the handle profile information of a user who sets (turns ON) blurring is viewed by other users, in an embodiment. In FIG. 15, an age is blurred as "twenties" and a sex is blurred as "SECRET". Incidentally, other than this, an occupation "VOCATIONAL SCHOOL STUDENT" may be blurred as "STUDENT". Thus, as to profile items that a user himself/herself does not want to provide detailed information, it becomes possible to provide it to other users in a blurred manner so that there occurs no fear of potential problems.

As explained above, according to the embodiment, a user can manage a user name which is used in services in association with information of characters which are used in services. Also, it is possible to control information relating to a user when the information is provided to other users.

The present invention is not limited to these embodiments, but various variations and modifications may be made without departing from the scope of the present invention set forth in the claims.

What is claimed is:

1. A server, connected to a plurality of user terminals through a network, manages character information of a plurality of users in each service provided to the users, comprising:
   a user name receiving system that receives, from at least one of the user terminals, a registration of user names to be used by the user within a predetermined service, each user name being selectively associated with different character information;
   a transmitter that transmits the received user names to the user terminal for display at the user terminal;
   a user name selection receiving system that receives, from the user terminal, a selection of a desired user name, from among the displayed user names, to be used by the user in the predetermined service;
   a storage that stores in a memory portion the received user name and character information to be used in the predetermined service in a linked manner;
   a converting system that blurs information relating to the user stored in the memory portion; and
   a transmitter that sends the blurred information to at least one user terminal of another user.

2. A method for processing information in a server that is connected to a plurality of user terminals through a network and that manages character information of a plurality of users in each service provided to the users, comprising:
   receiving, from at least one of the user terminals, a registration of user names to be used by the user within a predetermined service, each user name being selectively associated with different character information;
   transmitting the received user names to the user terminal for display at the user terminal;
   receiving, from the user terminal, a selection of a desired user name, from among the displayed user names, to be used by the user in the predetermined service;
   storing in a memory portion the received user name, information relating to the user, and the character information to be used in the predetermined service in a linked manner;
   blurring the stored information relating to the user stored; and
   transmitting the blurred information to at least one user terminal of another user.

3. A recording medium on which is recorded a program for causing a computer connected to a plurality of user terminals via a network to execute processing for managing character information of a plurality of users in each service provided to the users, the program comprising;
   receiving a registration of user names to be used by at least one of the users from the user terminals within a predetermined service, each user name being selectively associated with different character information;
   transmitting the received user names to the user terminal for display at the user terminal;
   receiving a selection of a desired user name, from among the displayed user names, to be used by the user in the predetermined service from the user terminal;
   storing in a memory portion the received user name and character information to be used in the predetermined service in a linked manner; and
   receiving, from the user terminal, a selection for each attribute of the information as to whether the attribute of the information relating to the user should be blurred when provided to other users, wherein the blurred attribute of the information is transmitted when the user has selected blurring and the attribute of the information is transmitted without any change when the user has not selected blurring.

* * * * *

UNITED STATES PATENT AND TRADEMARK OFFICE
CERTIFICATE OF CORRECTION

| | | |
|---|---|---|
| PATENT NO. | : 7,246,155 B2 | Page 1 of 1 |
| APPLICATION NO. | : 10/187371 | |
| DATED | : July 17, 2007 | |
| INVENTOR(S) | : Kazutoyo Maehiro | |

It is certified that error appears in the above-identified patent and that said Letters Patent is hereby corrected as shown below:

On the title page, item [56], under FOREIGN PATENT DOCUMENTS, in the reference: EP 10786667 change "10/1999" to -- 2/2001 --

On the title page, under OTHER PUBLICATIONS, please add the following reference:
-- English Language Abstract and Partial English Language translation of JP 2000-078182 --

On the title page 2, under OTHER PUBLICATIONS, in the reference: Atsushi Okamura, "Full-Scale Network RPG Age Beginning from UltimaOnline", Oh! PC, Japan, Sofbank Corporation, Jan. 15, 1998, vol. 16, No. 15, pp. change "193-20" to -- 193-205, and an English language partial translation thereof. --

Signed and Sealed this

Fifth Day of January, 2010

David J. Kappos
*Director of the United States Patent and Trademark Office*